United States Patent
Lunden et al.

(10) Patent No.: US 9,622,158 B2
(45) Date of Patent: Apr. 11, 2017

(54) MEASUREMENT PATTERN FOR SMALL CELL SEARCHING

(75) Inventors: Jari Petteri Lunden, Espoo (FI); Elena Virtej, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 40 days.

(21) Appl. No.: 14/375,359

(22) PCT Filed: Feb. 28, 2012

(86) PCT No.: PCT/US2012/027008
§ 371 (c)(1),
(2), (4) Date: Oct. 30, 2014

(87) PCT Pub. No.: WO2013/130052
PCT Pub. Date: Sep. 6, 2013

(65) Prior Publication Data
US 2015/0045024 A1 Feb. 12, 2015

(51) Int. Cl.
*H04W 48/16* (2009.01)
*H04W 48/20* (2009.01)
*H04W 84/04* (2009.01)

(52) U.S. Cl.
CPC .......... *H04W 48/16* (2013.01); *H04W 48/20* (2013.01); *H04W 84/045* (2013.01)

(58) Field of Classification Search
CPC ............... H04W 84/045; H04W 48/16; H04W 36/0061; H04W 36/0094; H04W 48/18; H04W 36/0083; H04W 36/08; H04W 48/20; H04W 52/0216; H04W 88/08; H04W 52/244; H04W 52/325; H04W 76/06;

(Continued)

(56) References Cited

U.S. PATENT DOCUMENTS

2010/0234014 A1* 9/2010 Virkki ............... H04W 36/0088
455/423
2010/0265918 A1* 10/2010 Marinier ............... H04W 36/20
370/332

(Continued)

FOREIGN PATENT DOCUMENTS

WO 2011/143672 A1 11/2011

OTHER PUBLICATIONS

International Search Report and Written Opinion received for corresponding Patent Cooperation Treaty Application No. PCT/US2012/027008, dated Dec. 6, 2012, 14 pages.

(Continued)

*Primary Examiner* — Nizar Sivji
(74) *Attorney, Agent, or Firm* — Squire Patton Boggs (US) LLP

(57) ABSTRACT

Methods and apparatus, including computer program products, are provided for small cell searching. In one aspect there is provided a method. The method may include searching, in a first mode, for a first cell including a first base station based on a first event; changing, based on a second event, to a second mode having a search rate different than the first mode, wherein the second mode searches for the first cell including the first base station; and establishing a connection from a user equipment to the first base station serving the first cell. Related apparatus, systems, methods, and articles are also described.

17 Claims, 7 Drawing Sheets

(58) Field of Classification Search
CPC . H04J 11/0069; H04J 11/0073; H04L 5/0085; H04L 5/0096
See application file for complete search history.

(56) References Cited

U.S. PATENT DOCUMENTS

| | | | |
|---|---|---|---|
| 2011/0092151 A1 | 4/2011 | Brisebois | |
| 2011/0124334 A1 | 5/2011 | Brisebois | |
| 2013/0190012 A1* | 7/2013 | Suzuki et al. | 455/456.1 |
| 2013/0217385 A1* | 8/2013 | Das et al. | 455/434 |
| 2014/0068307 A1* | 3/2014 | Koskinen | H04W 52/0209 |
| | | | 713/323 |

OTHER PUBLICATIONS

Nokia Siemens Networks et al., "Enhancements for Small Cell Detection", 3GPP Draft; R2-120523 Small Cell Discovery, 3rd Generation Partnership Project, Mobile Competence Centre; Dresden, Germany, Feb. 1012, vol. RAN WG2, 12 pages.

* cited by examiner

400

MEASUREMENT PATTERN FOR SMALL CELL SEARCHING

RELATED APPLICATION

This application was originally filed as Patent Cooperation Treaty Application No. PCT/US2012/027008 filed Feb. 28, 2012.

FIELD

The subject matter described herein relates to wireless communications.

BACKGROUND

A femtocell base station is a cellular base station configured for a small cell, or coverage area, examples of which include a residence, a small business, a building, or a small area. As such, the femtocell base station, such as for example a home base station (HNB) or a home E-UTRAN (evolved Universal Mobile Telecommunications System Terrestrial Radio Access Network) Node B base station (HeNB), may have functionality similar to a typical base station, such as an E-UTRAN Node B (eNB) base station, but the femtocell base station may have less range and power given its limited coverage area. For example, the femtocell base station may have power sufficient for a cell serving wireless devices within a limited range of about tens of meters.

Picocell base stations are another example of a small cell base station, but picocell base stations have somewhat greater range serving a small cell on the order of about 100-200 meters. Accordingly, wireless service providers view the femtocell base station and the picocell base station as a way to extend service coverage into a small cell, as a way to offload traffic to the femtocell base station, and/or as a way to provide enhanced service, such as higher data rates and the like, within the small cell, when compared to the larger macrocell served by a typical base station, such as the eNB base station.

SUMMARY

Methods and apparatus, including computer program products, are provided for small cell search.

In one aspect there is provided a method. The method may include searching, in a first mode, for a first cell including a first base station based on a first event; changing, based on a second event, to a second mode having a search rate different than the first mode, wherein the second mode searches for the first cell including the first base station; and establishing a connection from a user equipment to the first base station serving the first cell.

In some exemplary embodiments, one of more variations may be made as well as described in the detailed description below and/or as described in the following features. The first cell may include a small cell, and the first base station may include a small cell base station. The first base station may include at least one of a picocell base station, a femtocell base station, a home base station, and a home E-UTRAN node B base station. The mode may be changed to a first mode based on a first event, wherein the first mode searches for the first cell including the first base station more frequently than the second mode. The first event may include data being ready for at least one of transmission to, and reception at, the user equipment. The first event may include one or more of the following: an indication that the user equipment is proximate to the first cell and a change in a quality of a connection between the user equipment and a second base station serving a macrocell covering the user equipment. The second event may include a timer reaching a threshold. The changing to the first mode may occur, when an amount of traffic exceeds a threshold, wherein the traffic correspond to a transmission of data at least one of from and to the user equipment. The changing to the second mode may occur, when the amount of traffic does not exceed the threshold. One or more inter-frequency measurements may be inhibited, when an amount of traffic does not exceed a threshold. One or more inter-frequency measurements may be inhibited, when an amount of traffic does not exceed a threshold and a signal quality is above another threshold. The user equipment may send, based on information received from at least one of an operating system and an application, a message to a network, wherein the message requests, based on a data rate offered by a second base station serving a macrocell, offloading to the first base station comprising a small cell. At least one of the user equipment and a network may initiate the change.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
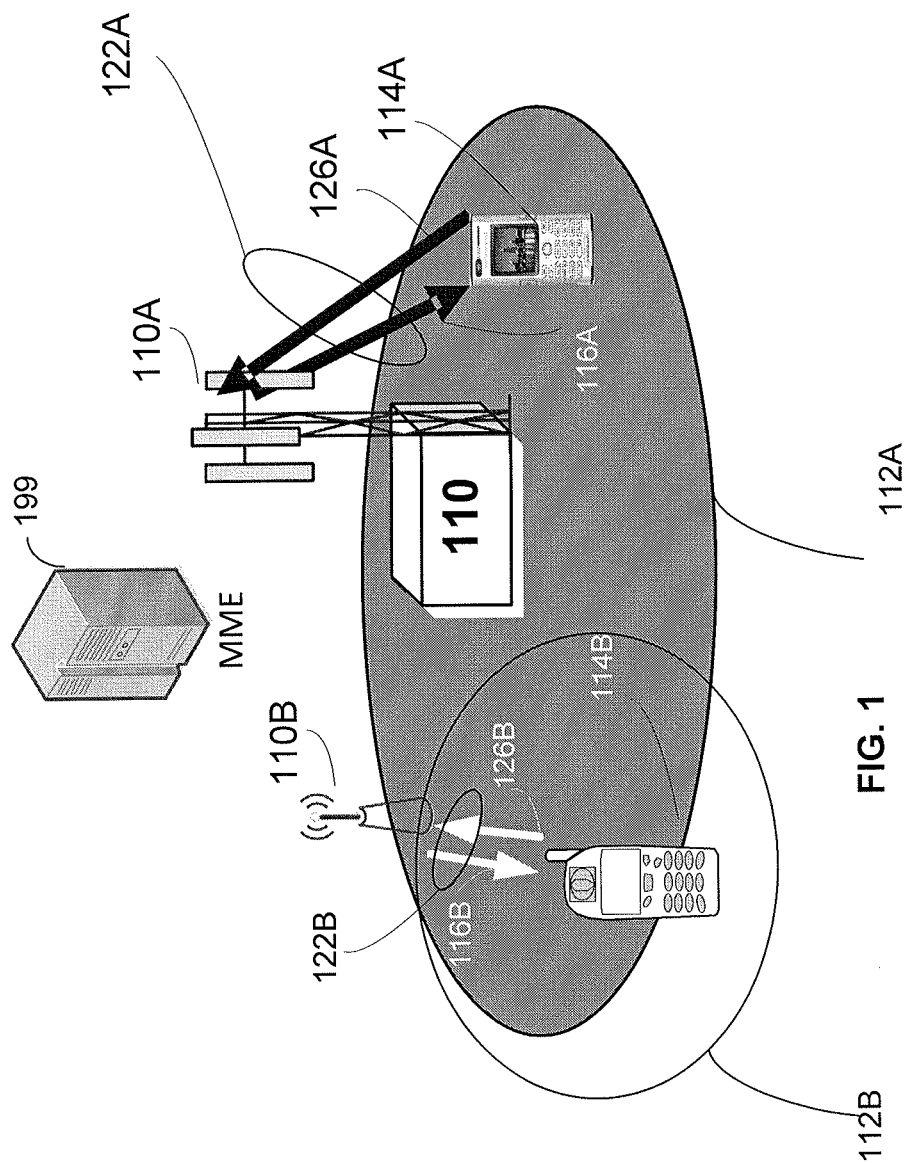
FIG. 1 depicts an example of a system configured to allow a user equipment to change modes when searching for small cells, in accordance with some exemplary embodiments.

Like labels are used to refer to same or similar items in the drawings.

DETAILED DESCRIPTION

FIG. 1 depicts a system 100 including a base station 110A, such as an eNB base station, supporting a corresponding coverage area 112A (also referred to as a cell and/or a macrocell). The base station 110A may be capable of communicating with wireless devices, such as user equipment 114A-B, within its coverage area 112A.

System 100 also includes a small cell 112B, such as a picocell, a femtocell, and the like, served by a small cell base station 110B. Examples of small cell base stations include a picocell base station, a femtocell base station, a home base station, and a home E-UTRAN node B base station (HeNB) configured in accordance with standards, such as for example Third Generation Partnership Project (3GPP) Long Term Evolution (LTE). Although LTE is referred to herein, it is merely an example as other standards and technologies may be used as well. Moreover, small cell base stations may operate on a different carrier frequency than the base station serving the larger macrocell, and, as such, when a user equipment is coupled to the a base station serving a larger macrocell, the user equipment may need to search different frequencies (than the base station) in order to find the small cell base station.

In some exemplary embodiments, user equipment 114B may establish a connection to base station 110A serving macrocell 112A, and then search for small cells served by small cell base station 110B in order to determine whether a connection can be established to the small cell base station 110B. By connecting to small cell base station 110B, the network can offload traffic to the small cell base station 110B. Moreover, in some exemplary embodiments, the searching for the small cell 112B may be based on an event, such as activity (e.g., traffic), at the user equipment 114B. To illustrate further, user equipment 114A may establish a connection to base station 110A, and then search for small cell 112B, but in some exemplary embodiments, user equipment 114B may initiate a search by scanning radio frequencies to measure whether there is a neighboring small cell 112B and/or small cell base station 110B. Moreover, the user equipment 114B may change how often it searches and measures for the small cell 112B based on an event, such as activity, in the sense that when there is activity the search/measurement for the small cell and/or small cell base station 110B (e.g., inter-frequency measurements to search and discover small cells) is performed more frequently.

For example, if the user equipment 114B has activity, such as traffic and/or an increase in the amount of traffic, to transmit (or receive), the user equipment 114B may change modes, so that it searches more frequently for the small cell 112B and/or small cell base station 110B. However, if the user equipment 114B has little or no activity (or a certain amount of time has passed since a small cell has been detected), the user equipment 114B may change modes to a background mode, such as a mode which searches for the small cell less frequently (which may include temporarily suspending searching altogether). This activity based searching may be initiated by the user equipment 114B and/or the network, such as base station 110A, mobility management entity 199, and/or another node of system 100. Moreover, the activity based searching, which allows the user equipment 114B to search less frequently for small cells, may save power at user equipment 114B, when compared to other search patterns. Moreover, the inter-frequency search may result in the user equipment searching a first set of frequencies for the base station serving the macrocell and searching a second set of frequencies for the small cell base station serving the small cell.

Although FIG. 1 depicts two base stations 110A-B, two cells, such as macrocell 112A and small cell 112B, and two-user equipment 114A-B, the system 100 may include other quantities of base stations, cells, and user equipment as well.

Moreover, the base station 110A may, in some exemplary embodiments, be implemented as an evolved Node B (eNB) type base station, as noted above. When this is the case, base station 110A may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards).

Small cell base station 110B may, in some exemplary embodiments, be implemented as a picocell base station, a femtocell base station, a home base station, and/or a home E-UTRAN node B base station (HeNB), as noted above. Although some of the examples herein refer to the small cell base station 110B as a femtocell base station, such as a HeNB, the small cell base station 110B may be implemented using other technologies and/or standards as well. Moreover, although FIG. 1 depicts an example of a configuration for the small cell base station 110B, the small cell base station 110B may be configured in other ways. For example, small cell base station 110B may have wired and/or wireless backhaul links to other network nodes, such as a mobility management entity 199, other base stations, a radio network controller, a core network, a serving gateway, and the like. In addition, small cells may be deployed on a different frequency than macrocells.

Although FIG. 1 depicts an example of a configuration for base station 110A, the base station 110A may be configured in other ways as well. For example, the base station 110A may include relays, cellular base station transceiver subsystems, gateways, access points, radio frequency (RF) repeaters, frame repeaters, and remote radio heads and include access to other networks as well. For example, base station 110A may have wired and/or wireless backhaul links to other network elements, such as other access points, base stations, remote radio heads, radio network controllers, core networks, serving gateways, mobility management entities (e.g., mobility management entity 199), and the like.

In some exemplary embodiments, the system 100 may include access links, such as links 122A-B. The access link 122A may include a downlink 116A for transmitting to the user equipment 114A and an uplink 126A for transmitting from user equipment 114A to the base station 110A. The downlink 116A may comprise a modulated radio frequency carrying information, such as user data, radio resource control (RRC) messages, location information, and the like, to the user equipment 114A, and the uplink 126A may comprise a modulated radio frequency carrying information, such as user data, RRC messages, location information, and the like, from the user equipment 114A to base station 110A. Access links 122B may include downlink 116B for transmitting from the small cell base station 110B to user equipment 114B, and uplink 126B for transmitting from user equipment 114B to the small cell base station 110B.

The downlink 116A and uplinks 126A may, in some exemplary embodiments, each represent a radio frequency (RF) signal. The RF signal may, as noted above, include data, such as voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies. Furthermore, the downlink 116B and uplink 126B may be configured using standards and/or technologies similar to those noted with respect to downlink 116A and uplink 126A, although downlink 116B and uplink 126B may use a different standards or technologies as well.

In some exemplary embodiments, the user equipment 114A-B may be implemented as a mobile device and/or a stationary device. The user equipment 114A-B are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some cases, user equipment may include a processor, a computer-readable storage medium (e.g., memory, storage, and the like), a radio access mechanism, and/or a user interface. For example, the user equipment may take the form of a wireless telephone, a computer with a wireless connection to a network, or the like.

In some exemplary embodiments, user equipment 114B may be configured to operate in a heterogeneous network (also referred to as a HetNet) including small cells, such as small cell 112B, and macrocells, such as cell 112A. In some example implementations configured as a heterogeneous network, user equipment 114B may access base station 110A, such as an evolved node B base station, serving macrocell 112A, and user equipment 114B may also access small cell base station 110B serving small cell 112B. In the example of the HetNet with macrocells and small cells (which has a limited coverage area) are configured with different frequencies, the user equipment 114B connected to base station 110A serving the large macrocell 112A may perform inter-frequency measurements to find available offloading opportunities offered by the small cells, such as small cell 112B.

For example, user equipment 114B may establish a connection to base station 110A serving the macrocell 112A, and search for small cells served by small cell base station 110B in order to determine whether a connection can be established to the small cell base station 110B. Moreover, in some exemplary embodiments, the searching for the small cell may be based on activity, such as traffic, at the user equipment 114B. To illustrate further, user equipment 114A may establish a connection to base station 110A, and then search for small cell 112B, but in some exemplary embodiments, user equipment 114B may initiate a search (e.g., by scanning frequencies) for the small cell 112B or search more frequently for the small cell 112B based on activity, such as traffic, at the user equipment 114B. For example, if the user equipment 114B has activity, such as traffic and/or an increase in the amount of traffic, to transmit or receive, the user equipment 114B may initiate a search by scanning frequencies for the small cell 112B or search more frequently for the small cell 112B (and/or the small cell base station 110B). Once small cell base station 110B is found, user equipment 114B may establish a connection by performing a random access and/or handover to small cell base station 110B. Handover to the small cell base station 110B may be commanded by the macrocell base station 110A in response to a measurement report sent by user equipment 114B. The measurement report may include information concerning small cell 112B, such as a cell identifier and signal strength, and/or macrocell 112A. The measurement report may be triggered based on certain measurement reporting events that user equipment 114B is monitoring (e.g., Event A3 as specified in TS 36.331).

Moreover, the use of activity based searching may, in some exemplary embodiments, allow a power savings by the user equipment 114B. For example, the small cell 112B served by small cell base station 110B may be configured to operate on frequencies which are different from the frequencies used by base station 110A serving macrocell 112A. Searching for small cells (or the corresponding small cell base stations) on other frequencies may, as noted above, consume a substantial amount of power at the user equipment 114B, especially if the searching is performed too frequently. Indeed, searching too often for small cells may consume a substantial amount of power at the user equipment 114B, but searching infrequently may miss opportunities to offload traffic from the macrocell 112A to the small cell 112B. The subject matter described herein may, in some exemplary embodiments, reduce the time and energy consumed by user equipment 114B searching for small cells, such as small cell 112B and small cell base station 110B, when compared to other cell search approaches which do not taken into account whether the user equipment 114B has activity in the form of active traffic.

In some exemplary embodiments, user equipment 114B may begin a search for small cells, such as small cell 112B, using relatively frequent measurements. For example, user equipment 114B may initially make relatively frequent measurements of the radio frequencies (e.g., for 6 millisecond and repeat that measurement every 40 or 80 milliseconds) in order to detect small cell base station 110B. However, the measurements may, in some exemplary embodiments, become less frequent. For example, user equipment 114B may gradually make measurements of the radio frequencies relatively less frequent (e.g., instead of 6 millisecond gap every 40 milliseconds a set of 10 measurement gaps of 6 milliseconds at intervals of 40 milliseconds repeated every 60 seconds, or 6 millisecond gap at intervals of 120 milliseconds, or 2 millisecond gap at intervals of 39 milliseconds, and/or suspending measurements altogether) when active traffic is not present/ready for reception at, or transmission from, the user equipment 114B. Even if active traffic is present, the measurements may be made relatively less frequent if no accessible small cell is detected within a certain period of frequent measurements (e.g., 1 second although other time periods may be used as well). Moreover, the change of mode to a less frequent mode may be performed by the user equipment 114B without signaling from the network (e.g., base station 110A, mobility management entity 199, and/or any other node), although the change of mode may be initiated by the network as well.

In some exemplary embodiments, the user equipment and the network (e.g., the base station or another node in the network) may agree on the interval used for the measurement patterns (or measurement opportunities). Moreover, the sample values for the measurement patterns are only examples as other values may be used as well.

In addition, the measurement pattern may, in some exemplary embodiments, include two modes, one for frequent, active measurement and one for less frequent, background cell search. The user equipment's measurement configuration may then be switched between these two modes depending on the situation. The user equipment 114B may be configured with just the active and background measurement modes, although other modes may be used as well. Moreover, the transition from one mode to the other may be based on the conditions and events known by both the user equipment and the network, although the conditions may also be known by one entity, which initiates the mode change. Alternatively, or in addition to, quick and light signaling (e.g., media access control (MAC) level message) may be configured between the user equipment 114B and base station 110B to update the user equipment's activity state (e.g., background, active, active mode with a high data, and the like).

Additionally, explicit signalling may be defined for the network or the user equipment to activate the frequent measurement mode (also referred to as pattern) and/or to enter into a less frequent, background search pattern. When configured at the user equipment 114B, the measurement pattern may start with infrequent measurements as well (e.g., if the user equipment is to be in the background search and there is no immediate reason for more frequent measurements). This may be configured as the default behavior, or it may depend on user equipment's current mode. Or, the configuration signaling may include an indication of which state to start from.

In some exemplary embodiment, user equipment 114B may be configured with a plurality of modes for searching for small cells. In a first mode, the user equipment 114B may initially make relatively frequent measurements of the radio frequencies (e.g., for 6 millisecond and repeat that measurement every 40 or 80 milliseconds) in order to detect small cell base station 110B. Moreover, when there is no active traffic to be sent to, and/or received from, user equipment 114B, the user equipment 114B may enter a second mode in order to consume less power when searching/measuring for the small cell base station 110B. In the second mode, the user equipment 114B may make relatively less frequent measurements of the radio frequencies (e.g., repeat for 5 times, 6 milliseconds at 40 millisecond intervals and repeat that measurement every 60 seconds). In addition, when there is active traffic to be sent to, and/or received from, user equipment 114B, the user equipment 114B may change modes to the first mode and thus search/measure more frequently for the small cell base station 110B. Although the previous example mentioned two modes, other search patterns, based on activity, may be used as well.

Figure 2:
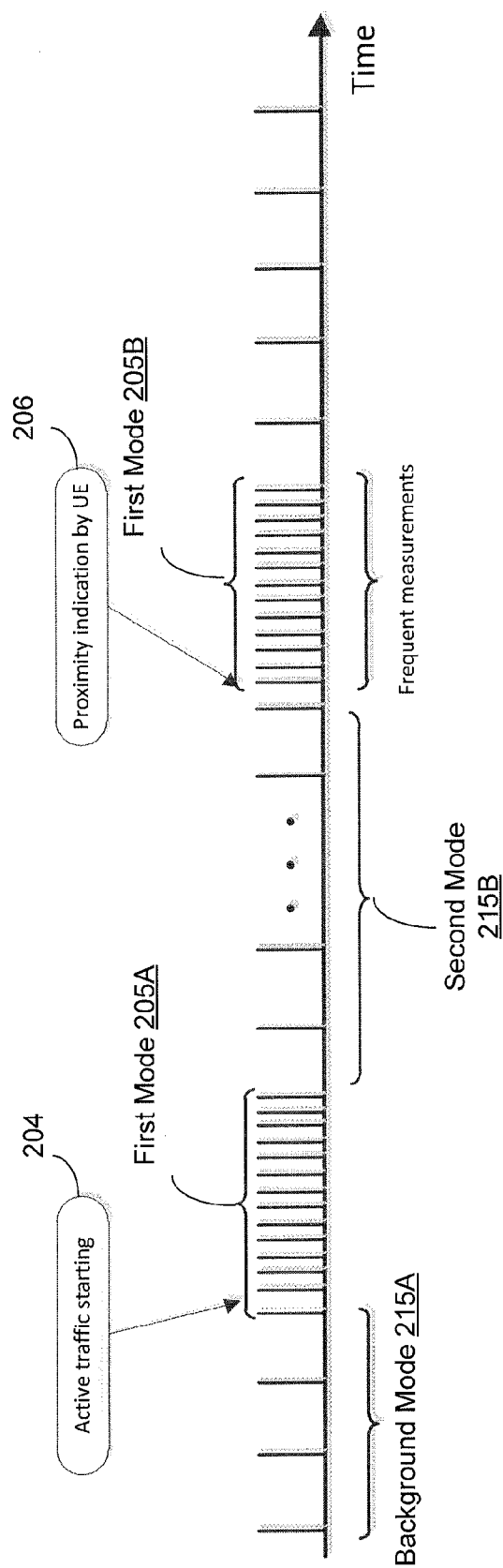
FIG. 2 depicts an example searching for small cells using a first mode and a second mode, in accordance with some exemplary embodiments.

FIG. 2 depicts an example of search measurements made by user equipment 114B over time, in accordance with some exemplary embodiments. When there is active traffic 204 to be sent to, and/or received from, user equipment 114B, the user equipment 114B may enter the first mode 205A and search/measure more frequently for the small cell base station 110B. When there is little or no active traffic to be sent to, and/or received from, user equipment 114B, the user equipment 114B may enter a second mode 215B in order to consume less power when searching/measuring for the small cell base station 110B. FIG. 2 also shows that the user equipment 114B may be configured to start searching, as a default mode, in the slower, second mode 215A (labeled background mode), although user equipment 114B may initiate searches for small cells in other modes as well. For example, user equipment 114B may be configured to initiate searches for the small cell in the faster first mode 205A to allow rapid detection of the small cell 112B and/or base station 110B, with a mode change based on an event, such active traffic, a proximity indication (see, e.g., 206), after a certain duration of time, and the like.

As noted, the proximity indication at 206 may indicate that user equipment 114B may be near a small cell 112B, and, when this is the case, user equipment 114B may change modes to the more frequent searches of the first mode 205B.

FIG. 2 may also show that searching for small cells may be done with high effort during the first modes 205A-B for a certain duration, rather than indefinitely. For example, the first mode 205A may continue for a certain duration established by a timer, after which a mode change occurs to the slower second mode 215B.

Although the example of FIG. 2 depicts two modes, there may be other modes having other searching/measuring patterns as well. For example, there may be an intermediate mode between the first and second mode to enable a gradual transition in the search rate between the first mode and the second mode. In some exemplary embodiments, the user equipment 114B may, as noted, have different modes for searching for small cells. These small cell search modes may include a low traffic mode, a medium traffic mode (which searches for small cells more frequently that the low traffic mode), and/or a high traffic mode (which searches for small cells more frequently than the medium traffic mode). And, the measurement of traffic may be averaged over a certain time period. Regarding gradually making the measurements less frequently, this could be, for example, that the search interval is doubled after each 1 second of searching until reaching maximum interval or reaching a level at which the search is fully suspended. For example, if the user equipment starts to perform inter-frequency measurements, starting with an active pattern (e.g., 6 ms every 40 ms), the user equipment may gradually slow the search pattern (e.g., 6 ms every 120 ms, then 6 ms every 1 sec).

The change of modes from a faster small cell search mode to a slower small cell search mode may be triggered by the user equipment 114B without being signaled by the network and/or triggered by the network. Moreover, the change in modes may be triggered by events, such as active traffic to be sent by (or received at) the user equipment 114B, an indication that the user equipment 114B is proximate to a small cell (referred to a proximity indicator), a timer (e.g., after expiration of a timer), signal/connection quality between user equipment 114B and the macrocell served by base station 110A, user equipment 114B moving to another cell, a handover, and/or any other event. In addition, these events that indicate increased need for measurements may reset the pattern to frequent measurements again without explicit signaling between the user equipment and network.

As noted, an event, such as active traffic to be sent by (or received at) the user equipment 114B, may trigger the user equipment 114B to change modes to scan more frequently for small cells, such as first modes 205A-B. For example, when there is continuous traffic activity the mode at the user equipment 114B may be changed to more frequent searches/measurements, such as the first modes 205A-B, so that the user equipment 114B can quickly detect whether a small cell is nearby. The active traffic may be detected based on one or more of the following: a buffer status report indicating more than a threshold amount of data in the buffer; a user data rate (e.g., user data rate over an observation window exceeding a threshold); transmissions on the uplink and/or downlink occurring more often than a threshold amount; discontinuous reception (DRX) state (e.g., a user equipment on active time versus sleep); and certain power saving/activity modes of the user equipment.

The power saving (or active mode) of the user equipment 114B may be signaled (e.g., using a MAC or RRC message) by the user equipment 114B to the network. This active mode may be based on information from application(s) or the operating system running on the user equipment 114B. The user equipment 114B may also signal to the network an indication of whether the user equipment 114B needs, or prefers, offloading (e.g., are the higher data rates potentially provided by a small cell 112B needed or is the currently experienced data rate provided by the macrocell 112A sufficient). The measurement mode change may be determined by the network in response to signaling from the user equipment, or the mode change may take place automatically, when a signaling message from user equipment is acknowledged Moreover, when the user equipment 114B does not have sufficient high data traffic (e.g., only low data rate background traffic), the user equipment 114B may, in some exemplary embodiments, determine that it is not necessary to connect to a small cell base station 110B because the macrocell 112A served by the base station 110A provides adequate service, and, as such, the user equipment 114B has no need to search for small cells (or the corresponding small cell base stations). Avoiding unnecessary measurements may, in some exemplary implementations, save power at the user equipment 114B, increase peak data rate, and/or increase scheduling flexibility.

In some exemplary embodiments, the user equipment 114B may be considered to have high traffic activity based on one or more of the following: if the amount of data in a buffer exceeds a threshold (e.g., over a 1 megabyte although other values may be used as well); a user data rate over an observation window which exceeds a threshold (e.g., 200 kilobits per second over a 5 second window, or 100 kilobits per second over a 5 minute window, etc); transmissions occurring more often than a threshold (e.g., more than 5 transmissions per second over a window of 5 seconds or over a window of 5 minutes, etc); user equipment's DRX state is active (not sleeping) more often than a threshold (e.g. user equipment's receiver is active over 30% of the time); and/or a power saving/activity mode is indicated by the user equipment (e.g., indicating high activity if the user is interacting with the device and applications that require network connection, etc). Alternatively, or in addition to, the activity threshold may be set to distinguish background traffic and active traffic so that the user equipment is considered to have background traffic if the traffic consist of only small, infrequent packets (e.g., 100 bytes every 10 seconds and/or the traffic is not delay sensitive and/or traffic is not interactive).

In addition, the user equipment 114B may, in some exemplary embodiments, be configured with different traffic activity modes based on traffic. For example, the user equipment 114B may be configured to have modes for low traffic to be sent by, or received at the user equipment, for medium traffic to be sent by, or received at the user equipment, and for high traffic to be sent by, or received at the user equipment. This may be a division between background traffic and active traffic (e.g., the user equipment may start downloading a large file or interactive traffic may be processed). In any case, the modes in use may be signaled to the network by user equipment 114B.

As another example, high traffic activity may increase the effect of other events. As such, the duration that the user equipment 114B stays in a more frequent search mode due to a proximity indication may be extended when there is high traffic activity to be sent by, or received at, the user equipment 114B. The inter-frequency measurement interval (or gap) may be changed (e.g., reduced and/or increased) automatically based on user traffic activity exceeding a configured level.

As noted, an event, such as a proximity indication, may, in some exemplary embodiments, trigger the user equipment 114B to change modes to scan more frequently for small cells, such as first modes 205A-B. For example, a proximity leaving message by user equipment 114B may reset the search/measurement pattern for small cells to a less frequent search mode (e.g., a background search mode). The proximity leaving message refers to a message with a type of "leaving" (rather than "entering") when the user equipment is leaving the area of a potential closed support group cell location, and this message may be configured in accordance with TS 36.331 (although other formats may be used as well).

As noted, an event, such as a handover, may, in some exemplary embodiments, trigger a change in mode. For example, when the user equipment 114B moves to another, target cell (which causes a change in the macrocell identifier), the new target cell (and the base station therein) may also provide a new search/measurement pattern to the user equipment 114B, or the prior base station may forward the prior search/measurement pattern to the target cell as well.

An event, such as the connection quality, may, in some exemplary embodiments, trigger a change in mode, as noted above. The quality of the connection between the user equipment 114B and base station 110A may trigger a change in mode. For example, a drop in the signal quality in the connection between the user equipment 114B and base station 110A may trigger a more frequent search/measurement mode at the user equipment 114B in order to find small cell 112B. An event, such as a time duration, may, in some exemplary embodiments, trigger a change in mode, as noted above. In some exemplary embodiments, when a certain amount of time (e.g., established by a timer) has elapsed since the user equipment 114B started the more frequent measurements of the first mode 205A-B (during which no small cell is found and no further event has restarted the timer as noted), the search/measurements may be reset to a less frequent mode, such as the second mode 215B.

In some exemplary embodiments, an event, such as a measurement report, may trigger a change in mode. For example, user equipment 114B may detect and report, in a measurement report to the base station 110A, the existence of small cell 112B. When this report is received, the network (or node therein, such as base station 110A and/or mobility management entity 199) may trigger user equipment 114B to search/measure in a less frequent mode, such as a background mode, although the user equipment 114B may initiate that mode change without being directed to do so by the network.

In some exemplary embodiments, being stationary for a given period time may constitute an event that triggers a change in mode. When stationary for a period of time, the user equipment 114B may enter a search/measurement mode for the small cell that is less frequent, such as the second mode 215B. The user equipment 114B may determine whether it is stationary based on one or more of the following: a mobility state estimation; radio measurements of signal strength; changes in uplink timing advance; and/or sensors, such as an accelerometer.

In some exemplary embodiments, events may have different priorities. For example, the traffic activity may be configured to have a higher priority than other events, so that the more frequent search/measurement pattern (e.g., the first mode 205B) may be used only when there is traffic activity. In this example, another event may cause a trigger as long as there is active traffic. As another example, active traffic may influence other events. For example, the duration of user equipment using the frequent first mode 205B search pattern after an event, such as a proximity indication, may be longer in the presence of active traffic, when compared to not having active traffic. Furthermore, an event occurring multiple, consecutive times, within a given period of time, may lead to first mode having shorter and shorter durations as the event occurs or preempting the first mode after a certain number of events.

Figure 3:
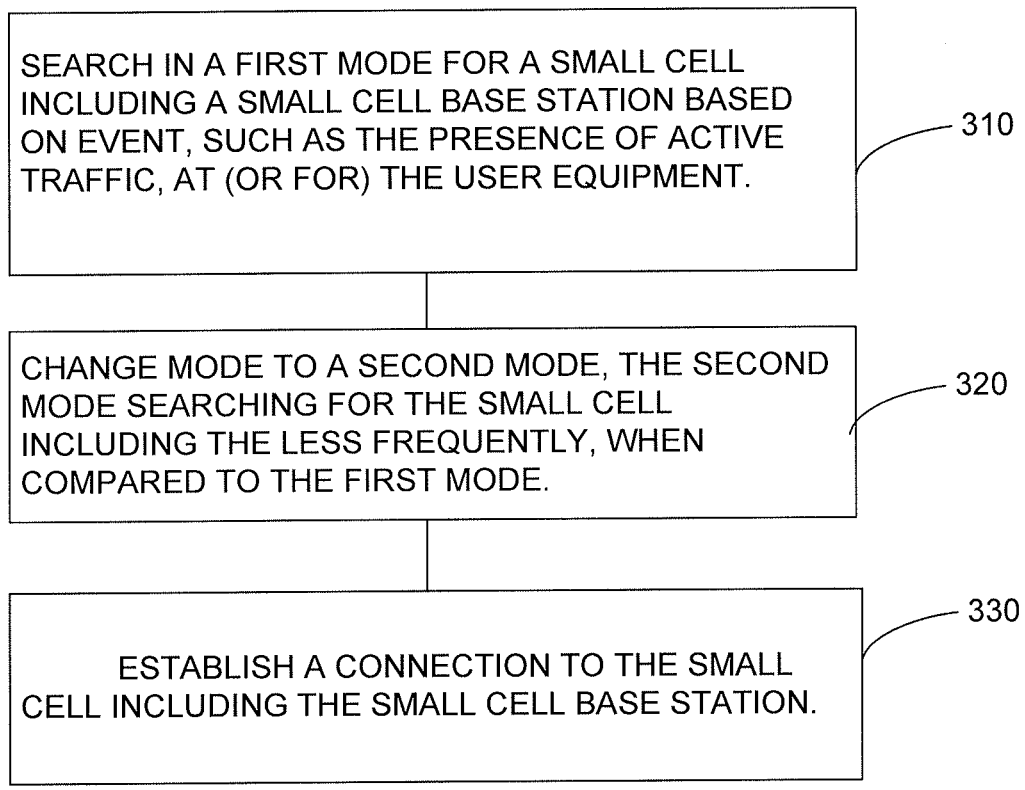
FIG. 3 depicts an example of a process for allowing a user equipment to change modes when searching for small cells, in accordance with some exemplary embodiments.

FIG. 3 depicts a process 300 for searching for a small cell based on an event, such as activity.

At 310, the user equipment may, in some exemplary embodiments, search in a first mode for a small cell including a small cell base station based on an event, such as the presence of active traffic and the like, at (or for) the user equipment. For example, the user equipment 114B may, in some exemplary embodiments, search more frequently in a first mode for small cell 112B and/or base station 110B. User equipment 114B may search for small cell base station 110B by detecting neighboring small cells. For example, user equipment 114B may measure the radio frequency spectrum for an indication, such as a probe signal from small cell base station 110B. The first mode, such as first mode 205A-B may search and/or measure over about a 6 millisecond interval and then repeated every 40 or 80 milliseconds in order to detect small cell base station 110B, although other patterns may be used as well.

At 320, the user equipment may, in some exemplary embodiments, change mode to a second mode. The second mode may include searching for the small cell less frequently, when compared to the first mode. For example, the user equipment 114B may, in some exemplary embodiments, search in a less frequent second mode 215-B (when compared to the first mode) for small cell 112B and/or base station 110B in order to save power at the user equipment 114B. The second mode 215A-B may configure user equipment 114B to measure the radio frequency spectrum for an indication that a probe signal (or, e.g., a beacon or a synchronization signal) from a small cell base station 110B is present over about a 6 millisecond interval and then repeat the measurement every 10 seconds in order to detect small cell base station 110B, although other patterns may be used as well. After detecting small cell base station 110B, the user equipment 114B may continue inter-frequency measurements according to the measurement pattern to measure the signal strength and/or signal quality of the small cell base station 110B, and to receive system information broadcast from the small cell base station 110B. The user equipment 114B may report this information (and any measurements) to the macrocell base station 110A, where the information may be used as a basis of a handover decision. Detection of a probe signal (or, e.g., a beacon or a synchronization signal) from a small cell base station 110B may cause the user equipment to go to the first measurement mode (e.g., with more frequent measurements) to make further measurements of the detected small cell base station 110B and receive broadcast of system information from the small cell base station 110B.

At 330, a connection may, in some exemplary embodiments, be established to the small cell including the small cell base station. The user equipment 114B may establish a connection to small cell base station 110B offloading traffic to the small cell 112B. Moreover, the mode changes described herein may, in some implementations, allow the user equipment to save power as noted above. Although process 300 is described with respect to an event comprising active traffic, the event may also comprise other types of events.

Figure 4A:
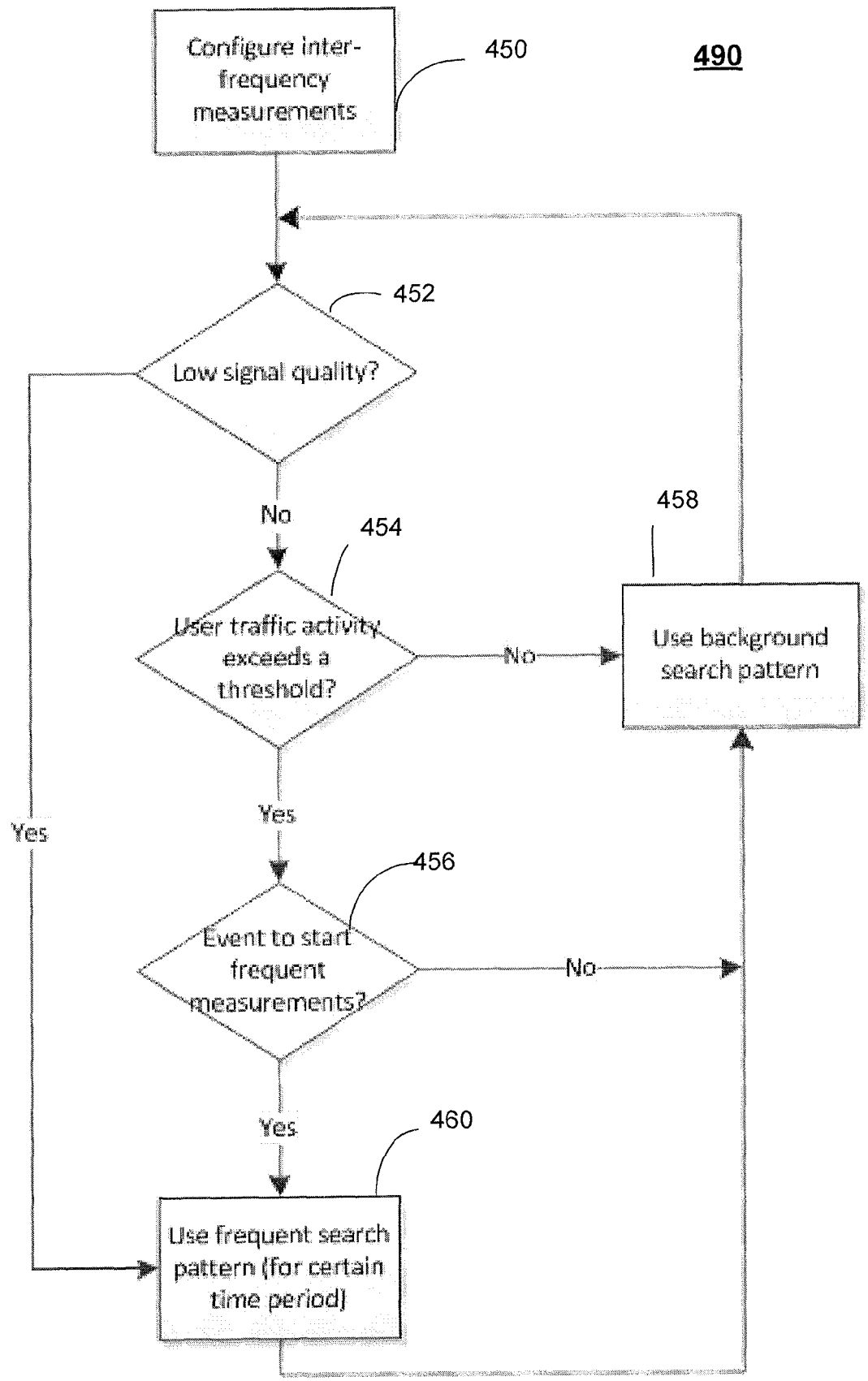
FIG. 4A-B depict example processes for allowing a user equipment to changes modes when searching for small cells, in accordance with some exemplary embodiments.

FIG. 4A depicts another example process 490 for changing search modes, in accordance with some exemplary embodiments.

At 450, the user equipment 114B may, in some exemplary embodiments, be configured to perform inter-frequency measurements in order to determine whether there is a neighboring small cell 112B including a small cell base station 110B. For example, user equipment 114B may have an established connection to base station 110A and perform inter-frequency measurements to search for neighboring small cell 112B.

At 452, if the signal quality is low, the user equipment 114B may, in some exemplary embodiments, initiate a frequent search pattern at 460 for a certain time in order to find a small cell 112B including a small cell base station 110B. If a small cell 112B is not detected after a certain time, the user equipment 114B may, in some exemplary embodiments, enter, at 458, a less frequent background mode to search for cell 112B and small cell base station 110B.

At 452, if the signal quality is not low (e.g. good signal quality enabling low bit errors and the like), the user equipment 114B may, in some exemplary embodiments, determine, at 454, whether the traffic at the user equipment 114B (or traffic to be sent to user equipment 114B) exceeds a threshold amount representing a high amount of activity (e.g., a data rate over the last 3 seconds exceeds 500 kilobits per second, or a data rate over the last 2 minutes exceeds 100 kilobits per second; or there is more than 1 megabit of buffered data waiting for transmission to, or reception at, the user equipment). When the traffic exceeds the threshold, user equipment 114B may, in some exemplary embodiments, initiate, at 456, the user equipment 114B to enter, at 460, the more frequent search mode representing more frequent measurements to search for neighboring small cell 112B including small cell base station 110B. Moreover, the user equipment 114B may, as noted above, remain in the more frequent search mode for a certain period of time, after which it may enter a less frequent background search mode at 458.

In the example of FIG. 4A, traffic activity and signal quality may be given higher priority than other events. As such, combining signal level and user activity conditions to control measurement rate, when searching for small cell base stations, may provide, in some implementations, a single measurement gap pattern configuration, which is sufficient for both coverage and offloading measurement purposes and may avoid the need for the network to configure separate measurements for these different purposes (i.e., coverage and offloading).

In the example of FIG. 4A, the signal quality may be defined as an event affecting whether the rate at which the user equipment 114B searches for small cells. The signal quality condition may be configured, in some exemplary embodiments, as an optional condition, and the presence of active traffic (which is ready for transmission to, or reception at, the user equipment) may be configured as a higher priority condition. Other events and/or explicit commands from the network may also initiate frequent measurements, when user activity exceeds a configured traffic activity level. The optional "low signal quality" condition at 452 may address the coverage reason measurements. The "event to start frequent measurements" optional condition at 456 includes for example starting active traffic session, proximity indication by user equipment, movement of user equipment, handover, and the like.

Figure 4B:
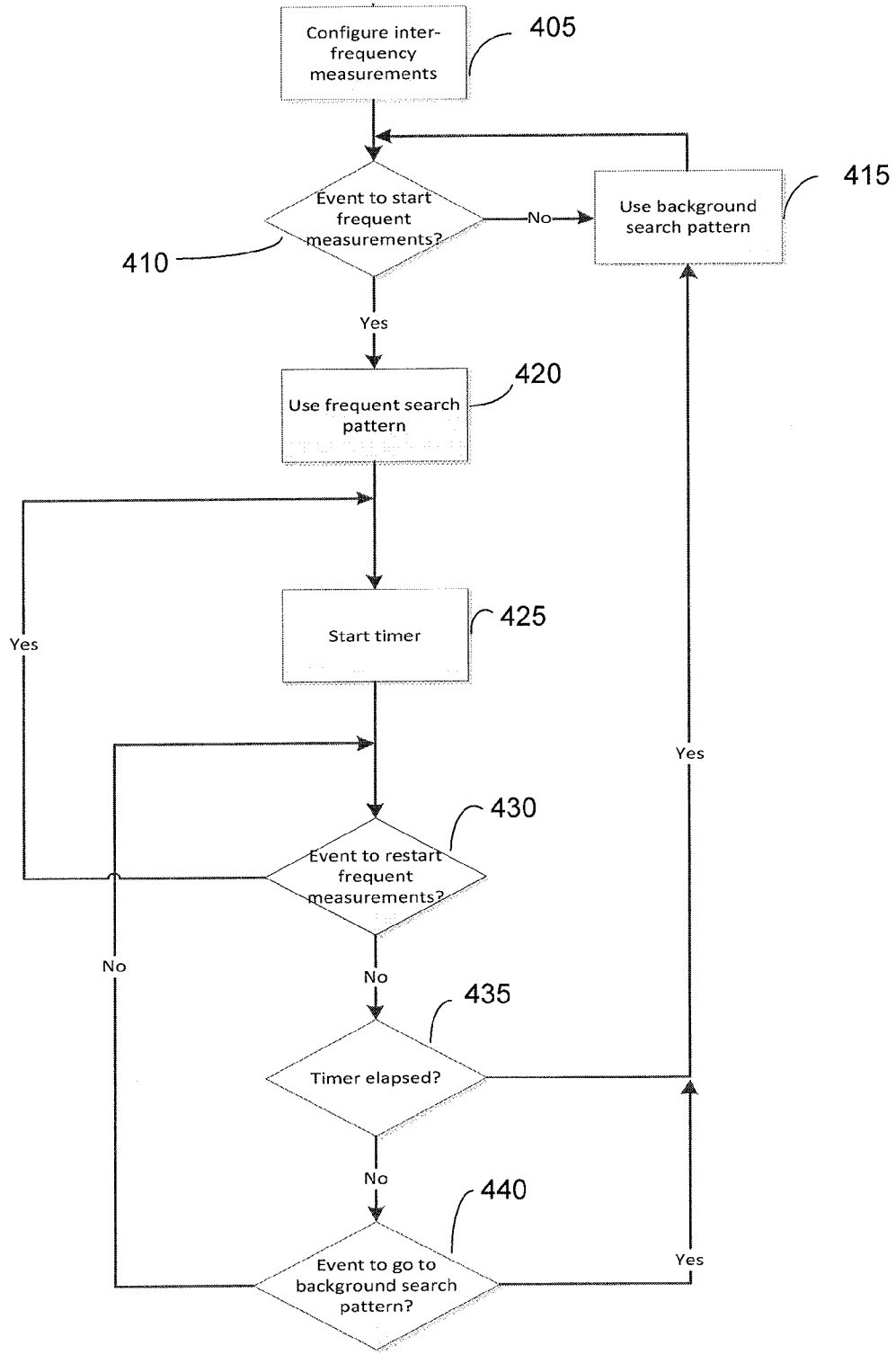

FIG. 4B shows an example of a process 400 for controlling the search/measurement patterns at a user equipment detecting a small cell, in accordance with some exemplary embodiments.

At 405, the user equipment 114B may, in some exemplary embodiments, be configured to perform inter-frequency measurements in order to determine whether there is a neighboring small cell 112B including a small cell base station 110B. For example, user equipment 114B may have an established connection to base station 110A and perform inter-frequency measurements to search for neighboring small cell 112B.

The inter-frequency measurements may be configured as measurement opportunities or measurement gaps, during which user equipment 114B is allowed to measure a frequency other than the operating frequency of base station 110A (e.g., when base station 110A does not schedule uplink or downlink transmissions for the user equipment during the measurement gaps). In this case, the user equipment 114B and base station 110A are both aware of the measurement gap pattern and the events that change the mode of the search pattern from frequent searches for small cells to less frequent searches for small cells, so that both the user equipment 114B and base station 110A can follow the same search pattern.

At 410, if there is an event, such as traffic activity and the like, the user equipment 114B may be coupled to base station 110A and may enter a first mode representing relatively frequent measurements made when searching for neighboring small cell 112B including a small cell base station 110B. However, if there is no event, such as traffic activity and the like, the user equipment may, at 415, enter a second mode representing less frequent measurements (e.g., also referred to herein as a background mode) made when searching neighboring small cell 112B including small cell base station 110B.

In some exemplary embodiments, the less frequent measurements may be accomplished by user equipment 114B by skipping or omitting measurements even though a frequent measurement pattern or measurement gaps have been configured. Subsequently, the user equipment 114B may also omit measurement reporting or measurement event monitoring that is expected/required according to the frequent measurement pattern and its configuration. The configured frequent measurements may be skipped, for example, if the user equipment's traffic is below a threshold, when monitored over a time window.

At 420, when the more frequent search pattern is used, a timer may be started at 425. If the timer elapses at 435 before another event, such as traffic activity and the like, causes the timer to be reset at 430, the user equipment may enter, at 440, a second mode representing the less frequent measurements (or background mode) made when searching for neighboring small cell 112B including a small cell base station 110B.

In some exemplary embodiments, the user equipment 114B may be explicitly signaled by the network (e.g., by a node therein) to change search and measurement modes. For example, base station 110A and/or base station 110B may send a message to user equipment 114B to initiate a first mode to search more frequently for small cells, initiate a second mode to search less frequently for small cells, and/or initiate an intermediate mode to gradually change the search pattern between the first and second modes. Although the previous examples described three modes, other modes and patterns may be used as well. The message may be MAC or RRC signaling from network (e.g., base station) to user equipment to indicate a change of measurement mode. The message may be sent in response to user equipment's traffic exceeding a threshold (e.g., a large amount of data in the base station buffer for user equipment).

Figure 5:
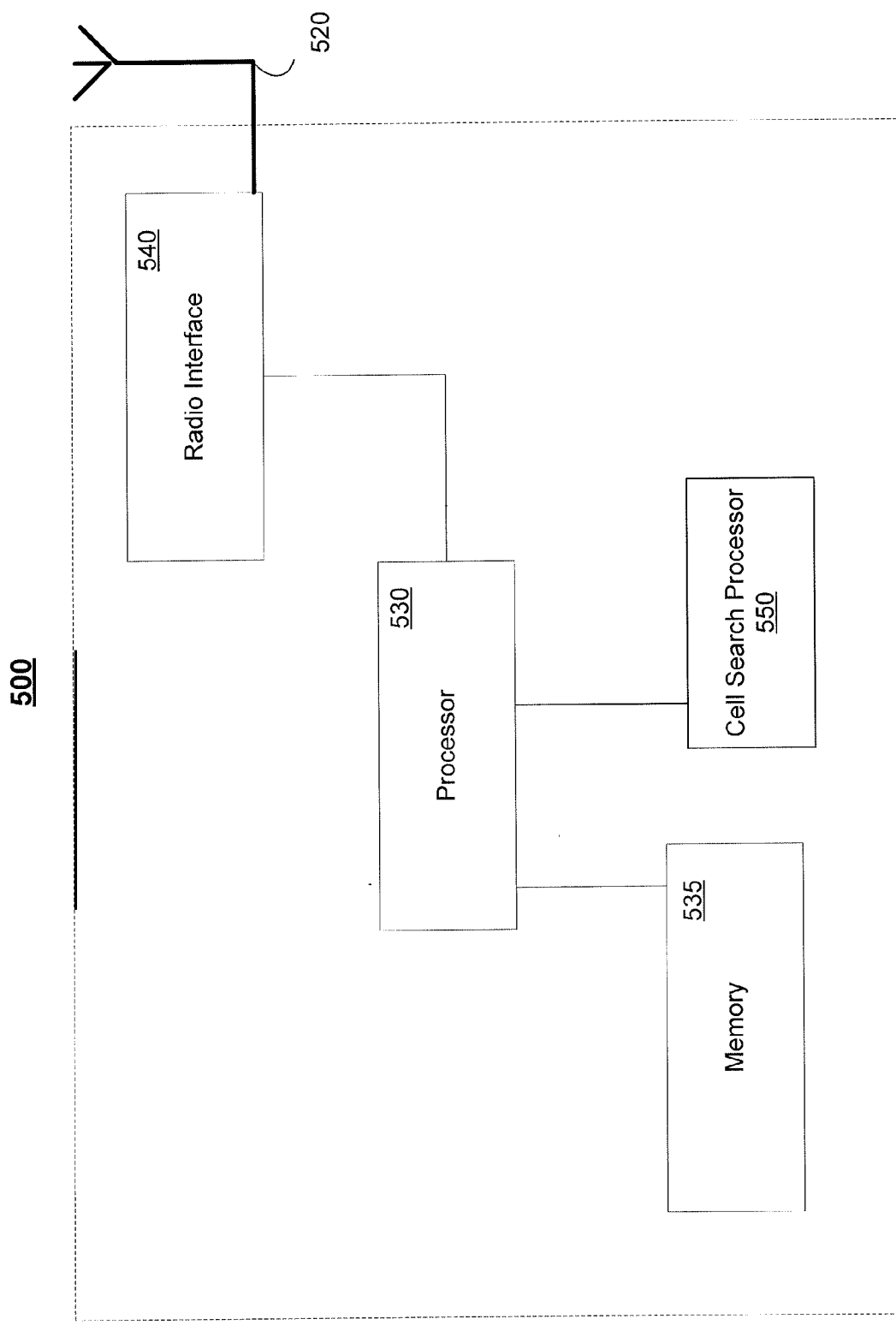
FIG. 5 depicts an example of a base station, in accordance with some exemplary embodiments.

FIG. 5 depicts an example implementation of a base station 500, which may be implemented at base station 110A and/or small cell base station 110B. The base station may include one or more antennas 520 configured to transmit via a downlink and configured to receive uplinks via the antenna(s) 520. The base station may further include a radio interface 540 coupled to the antenna 520, a processor 530 for controlling the base station 500 and for accessing and executing program code stored in memory 535. The radio interface 540 may further include other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). In some implementations, the base station may also be compatible with IEEE 802.16, LTE, LTE-Advanced, and the like, and the RF signals of downlinks and uplinks are configured as an OFDMA signal. The base station may include an interference processor 550. In some implementations, the cell search processor 550 may perform one or more of the operations described herein with respect to a base station.

Figure 6:
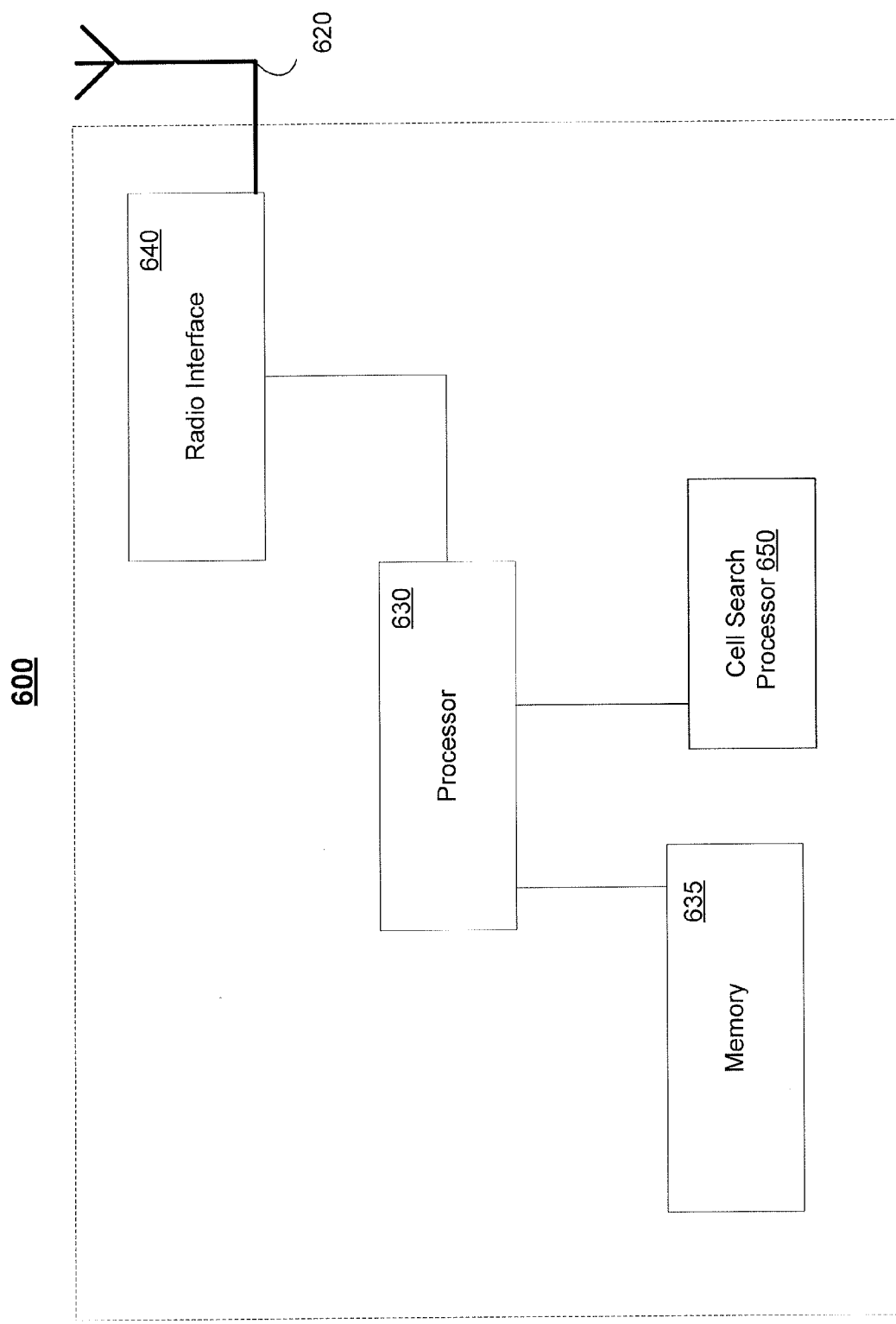
FIG. 6 depicts an example of user equipment, in accordance with some exemplary embodiments.

FIG. 6 depicts a block diagram of a radio, such as a user equipment 600. The user equipment 600 may include an antenna 620 for receiving a downlink and transmitting via an uplink. The user equipment 600 may also include a radio interface 640, which may include other components, such as filters, converters (e.g., digital-to-analog converters and the like), symbol demappers, signal shaping components, an Inverse Fast Fourier Transform (IFFT) module, and the like, to process symbols, such as OFDMA symbols, carried by a downlink or an uplink. In some implementations, the user equipment 600 may also be compatible with WiFi, Bluetooth, GERAN, UTRAN, E-UTRAN, and/or other standards and specifications as well. The user equipment 600 may further include at least one processor, such as processor 630, for controlling user equipment 600 and for accessing and executing program code stored in memory 635. The user equipment may include a cell search processor 650. In some exemplary embodiments, the cell search processor 650 may perform one or more of the operations described herein with respect to user equipment.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, although the change in search pattern is described with respect to small cell base station 110B, other types of base stations and access points may change search modes as described herein. Moreover, the implementations described above may be directed to various combinations and sub-combinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   searching, in a first mode having relatively frequent measurements, for a first cell including a first base station, wherein the searching is based on a first event at a user equipment;
   when the first mode is being used, starting a timer;
   when the timer elapses, changing to a second mode having less frequent measurements than the first mode, wherein the second mode searches for the first cell including the first base station; and
   establishing a connection from the user equipment to the first base station serving the first cell,
   wherein the first event comprises data being ready for at least one of transmission to, and reception at, the user equipment,
   wherein the method further comprises
   changing to the first mode, when an amount of traffic exceeds a threshold, wherein the traffic corresponds to a transmission of data at least one of from and to the user equipment;
   changing to the second mode, when the amount of traffic does not exceed the threshold; and
   inhibiting, when the amount of traffic does not exceed the threshold and a signal quality is above another threshold, one or more configured inter-frequency measurements.

2. A method as in claim 1, wherein the first cell comprises a small cell, and the first base station comprises a small cell base station.

3. A method as in claim 1, wherein the first base station comprises at least one of a picocell base station, a femtocell base station, a home base station, and a home E-UTRAN node B base station.

4. A method as in claim 1, further comprising:
   changing, based on the first event, to the first mode, wherein the first mode searches for the first cell including the first base station more frequently than the second mode.

5. A method as in claim 1, wherein first event comprises one or more of the following: an indication that the user equipment is proximate to the first cell and a change in a quality of a connection between the user equipment and a second base station serving a macrocell covering the user equipment.

6. A method as in claim 1, further comprising:
   inhibiting, when an amount of traffic does not exceed a threshold, one or more inter-frequency measurements.

7. A method as in claim 1, further comprising:
   sending, by the user equipment based on information received from at least one of an operating system and an application, a message to a network, wherein the message requests, based on a data rate offered by a second base station serving a macrocell, offloading to the first base station comprising a small cell.

8. A method as in claim 1, wherein at least one of the user equipment and a network initiates the change.

9. An apparatus comprising:
   at least one processor; and
   at least one memory including code, which when executed by the at least one processor causes operations comprising:
      searching, in a first mode having relatively frequent measurements, for a first cell including a first base station, wherein the searching is based on a first event at a user equipment;
      when the first mode is being used, starting a timer;
      when the timer elapses, changing to a second mode having less frequent measurements than the first mode, wherein the second mode searches for the first cell including the first base station; and
      establishing a connection from the user equipment to the first base station serving the first cell,
   wherein the first event comprises data being ready for at least one of transmission to, and reception at, the user equipment,
   wherein the operations further comprise
      changing to the first mode, when an amount of traffic exceeds a threshold, wherein the traffic correspond to a transmission of data at least one of from and to the user equipment;
      changing to the second mode, when the amount of traffic does not exceed the threshold; and
      inhibiting, when the amount of traffic does not exceed the threshold and a signal quality is above another threshold, one or more configured inter-frequency measurements.

10. An apparatus as in claim 9, wherein the first cell comprises a small cell, and the first base station comprises a small cell base station.

11. An apparatus as in claim 9, wherein the first base station comprises at least one of a picocell base station, a femtocell base station, a home base station, and a home E-UTRAN node B base station.

12. An apparatus as in claim 9, further comprising:
    changing, based on the first event, to the first mode, wherein the first mode searches for the first cell including the first base station more frequently than the second mode.

13. An apparatus as in claim 9, wherein first event comprises one or more of the following: an indication that the user equipment is proximate to the first cell and a change in a quality of a connection between the user equipment and a second base station serving a macrocell covering the user equipment.

14. An apparatus as in claim 9, further comprising:
    inhibiting, when an amount of traffic does not exceed a threshold, one or more inter-frequency measurements.

15. An apparatus as in claim 9, further comprising:
sending, by the user equipment based on information received from at least one of an operating system and an application, a message to a network, wherein the message requests, based on a data rate offered by a second base station serving a macrocell, offloading to the first base station comprising a small cell.

16. An apparatus as in claim 9, wherein at least one of the user equipment and a network initiates the change.

17. A non-transitory computer readable medium including code which when executed by at least one processor causes operations comprising:
searching, in a first mode having relatively frequent measurements, for a first cell including a first base station, wherein the searching is based on a first event at a user equipment;
when the first mode is being used, starting a timer;
when the timer elapses, changing to a second mode having less frequent measurements than the first mode, wherein the second mode searches for the first cell including the first base station; and
establishing a connection from the user equipment to the first base station serving the first cell,
wherein the first event comprises data being ready for at least one of transmission to, and reception at, the user equipment,
wherein the operations further comprise
changing to the first mode, when an amount of traffic exceeds a threshold, wherein the traffic correspond to a transmission of data at least one of from and to the user equipment;
changing to the second mode, when the amount of traffic does not exceed the threshold; and
inhibiting, when the amount of traffic does not exceed the threshold and a signal quality is above another threshold, one or more configured inter-frequency measurements.

* * * * *